United States Patent

[11] 3,576,160

| [72] | Inventors | Floyd Myer<br>New Holland;<br>Ernest Schoeneberger, Lancaster, Pa. |
|---|---|---|
| [21] | Appl. No. | 871,857 |
| [22] | Filed | Oct. 28, 1969 |
| [45] | Patented | Apr. 27, 1971 |
| [73] | Assignee | Sperry Rand Corporation<br>New Holland, Pa. |

[54] TWINE TENSIONING ATTACHMENT
5 Claims, 3 Drawing Figs.

[52] U.S. Cl. .................................................. 100/21
[51] Int. Cl. ...................................................... B65b 13/08
[50] Field of Search ........................................... 100/19, 20, 21, 22, 23, 24

[56] References Cited
UNITED STATES PATENTS

| 764,318 | 7/1904 | Towner | 100/23X |
| 808,153 | 12/1905 | Heldt | 100/21 |
| 1,213,993 | 1/1917 | Zachow | 100/19 |
| 2,548,559 | 4/1951 | Ronning et al. | 100/21X |
| 2,727,457 | 12/1955 | Hedtke | 100/21 |
| 2,731,909 | 1/1956 | Rudeen | 100/22 |
| 2,917,993 | 12/1959 | Nikkel | 100/21X |

*Primary Examiner*—Billy J. Wilhite
*Attorneys*—Joseph A. Brown, John C. Thompson, James J. Kennedy and George C. Bower ABSTRACT: A twine tensioning attachment for a baling machine having a spring loaded twine tensioning lever and twine guides located between a twine box and the needles of the baler for maintaining tension on the twine so as to withdraw slack twine during the tying cycle and thereby prevent looping of slack twine around the baler needles.

INVENTORS
FLOYD MYER and
ERNEST SCHOENEBERGER

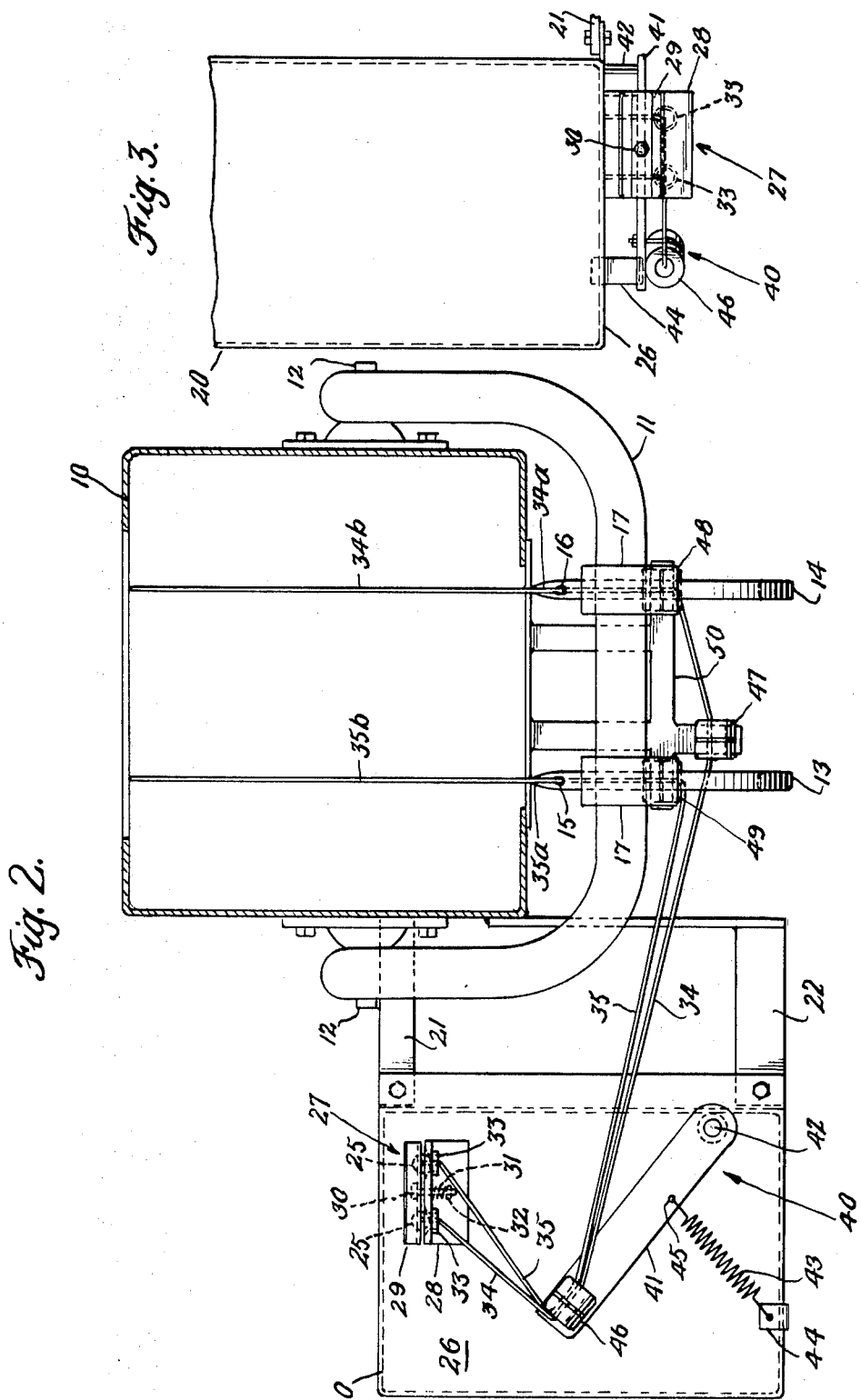

TWINE TENSIONING ATTACHMENT

FIELD OF INVENTION

This invention relates generally to a twine tensioning attachment for a baling machine and specifically to a lever mechanism operating to apply increased tension to the twine leading to the baler needles during a knot tying operation and as the needles are in their return movement to a home position.

BACKGROUND OF THE INVENTION

During the twine tying or knotting operation of a baling machine one end of the twine, (the so called number one twine), is clamped in a twine holder of a knotter mechanism and then leads downwardly through the bale case to and through the eye of a needle positioned in its home or down position and from the needle to a twine box. As a bale is formed this downwardly extending tensioned [number one] twine is force ahead by a reciprocating bale plunger acting on hay charges until a completed bale is formed.

Next the needle travels upwardly from its home position, through the bale case and behind the formed bale carrying with it an intermediate portion of the twine, (the so called number two twine). The needle travels to the twine holder of the knotter mechanism where the intermediate portion of the twine is clamped by the twine holder so that both ends of the twine looped around the bale are clamped in the twine holder.

Next the knotter mechanism operates to tie a knot in well-known manner and then the needle goes into its return stroke toward its home position with the eye of the needle sliding downwardly along the twine leading downwardly across the bale case from the twine holder, through the eye of the needle and to the twine box. This portion of the twine is the so-called number three twine and now becomes the number one twine for the next bale to be formed.

It is important that proper tension be applied to the number three twine to take up slack in the twine during the above tying cycle to prevent looping of the slack twine around the needle in the region of the knotter mechanism with consequent severe fraying of the twine and knot failure.

SUMMARY OF THE INVENTION

While certain prior attempts have been made to provide tensioning means for preventing slack the present invention is directed to an improved, simplified and effectively operating tensioning device.

Accordingly the present invention provides a simple and effective tensioning attachment operating to ensure that proper twine tension is provided during the bale forming and knot tying operations of the baler. To this end a simple spring loaded tensioning lever and uniquely associated twine guides are provided.

DESCRIPTION OF THE DRAWINGS

FIG. 2 is a cross section taken on the line 2–2 of FIG. 1; and

FIG. 3 is a fragmentary plan view of the tensioning mechanism and twine box of FIG. 2.

DESCRIPTION OF THE PREFERRED EMBODIMENT

Figure 1:
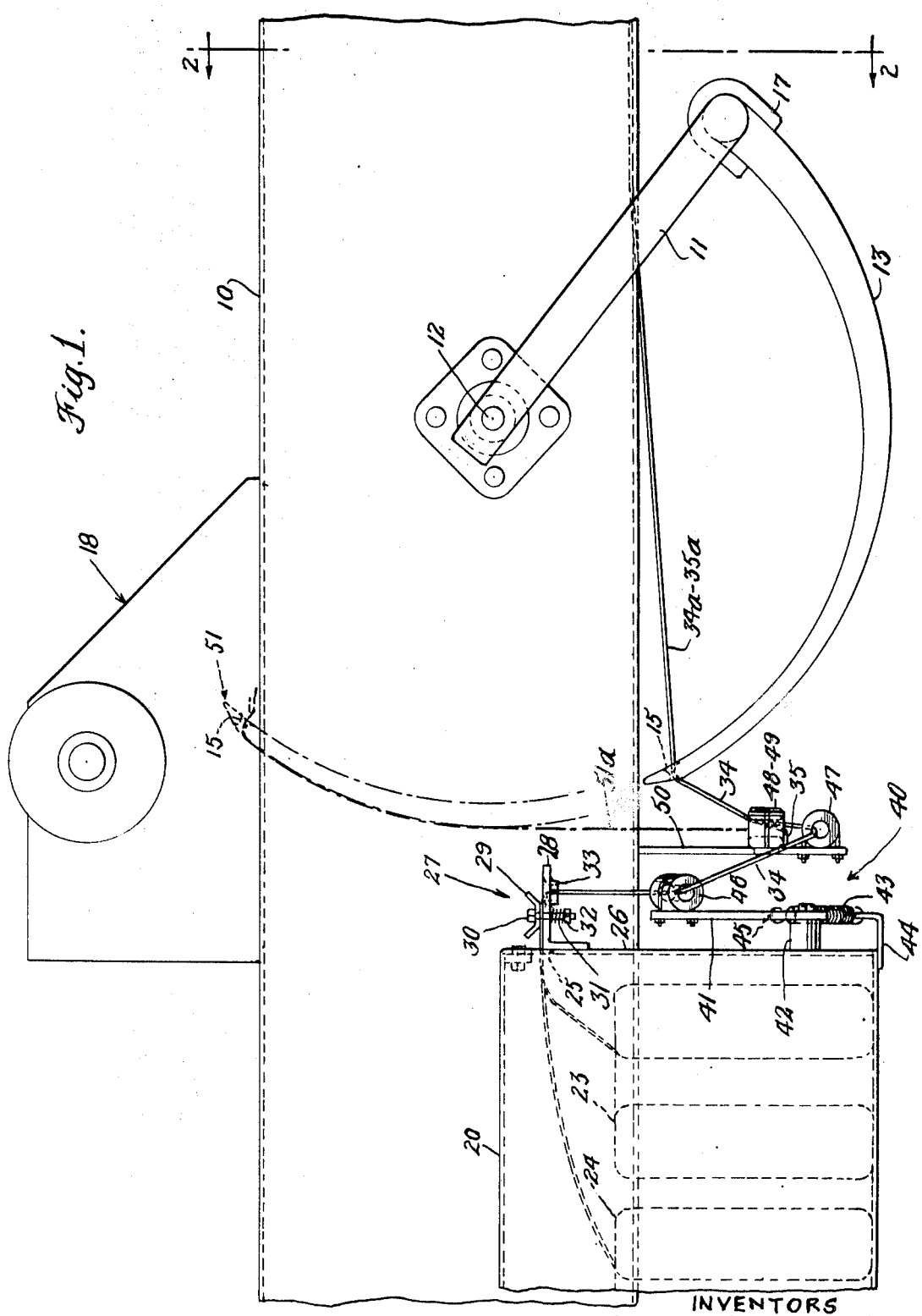
FIG. 1 is a fragmentary side elevation of a hay baler illustrating a twine tensioning attachment constructed in accordance with the invention.

Referring to the drawings the reference numeral 10 illustrates a bale case of a conventional baler comprising in general a needle yoke 11 pivotally mounted on the bale case at 12; needles 13 and 14 secured to the yoke 11 at 17 and having eyes 15 and 16 adjacent their tips; and knotter mechanism generally indicated at 18. The knotter mechanism is of known form and includes knot tying mechanism and associated twine clamping means well understood to those skilled in the art.

A twine box 20 is mounted at one side of the bale case 10, as shown in FIG. 2, by means of suitable supports 21 and 22. As seen in FIG. 1 two spools of twine 23 and 24 are located in the twine box, one for supplying twine to the left-hand needle 13 (FIG. 2) and the other for supplying twine to the right-hand needle 14.

The twine box is provided with a pair of spaced apertures, 25,25 in the wall 26 through which twine is threaded from the spools to a friction device 27 mounted on the wall 26 of the twine box. The friction device 27 comprises a bracket 28 fixedly secured to the wall 26 at the apertures 25, a friction plate 29, a retaining bolt 30, a spring 31 carried by the bolt 30 for resiliently urging the friction plate 29 toward the fixed bracket 28 and an adjusting nut 32 for adjusting the tension of the spring 31. The bracket 28 is provided with a pair of spaced apertures 33,33 in alignment with the apertures 25,25 of the twine box. The strands of twine 34 and 35 being unwound from the spools 23 and 24 are threaded through the apertures 25,25, then between the bracket 28 and friction plate 29, then downwardly through the apertures 33,33 of the fixed bracket 28, then through guides of the twine tensioning device 40 and finally through the eyes 15 and 16 of the needles 13 and 14. The friction device 27 provides a constant tension on the strands of twine as they pass from the spools 23 and 24 to the needles 13 and 14.

The twine tensioning device 40 of this invention comprises a simple twine tensioning lever 41 pivotally mounted at 42 on the wall 26 of the twine box 20 at a point below the friction device 27, a biasing spring 43 anchored at one end to a tab 44 of the twine box and attached at its other end to the lever 41 at 45, a twine guide 46 secured to the lever 41 at its free end, and twine guides 47,48 and 49 secured on a bracket 50 fixedly attached to the bottom of the bale case as clearly seen in FIG. 2.

The strand of twine 34, above referred to angles downwardly from the guide 46 of the spring loaded tension lever to the lower fixed guide 47 of the fixed bracket 50, then angles upwardly to the fixed guide 48 of the bracket 50 and then angles upwardly to and through the eye 16 of the needle 14.

The strand of twine 35 above referred to angles downwardly from the guide 46 of the tension lever to the fixed guide 49 of the fixed bracket 50 and then angles upwardly to and through the eye 15 of the needle 13.

As shown in FIGS. 1 and 2 the strands of twine 34 and 35 lead forwardly from the needles as strands 34a and 35a, then upwardly around the forward end of the bale as strands 34b and 35b as seen in FIG. 2 and finally along the top of the bale to the knotter mechanism 18 where they are clamped in place by a twine holder of the knotter mechanism in well-known manner.

On the upswing of the needles through the bale case, behind the formed bale, the needles reach the knotter mechanism, as indicated in dot and dash lines at 51 in FIG. 1, and the strands 51a leading upwardly from the tensioning device 40 are clamped in place by the knotter twine holders. Since the strands 51a are held by the twine holders the eyes of the needles, in the down swing of the needles, ride down the strands 51a and when the needles reach their fully down position the next bale being formed pushes the strands along the bale case in front of the formed bale.

In this connection it is pointed out that at the start of the return stroke of the needles tension is applied to the strands 51a because the tension lever 41 is being spring urged to the position of FIG. 2 to create a pull on the strands 51a. Thus the slack in the twine, which has been found to develop in the absence of the present invention, during the tying cycle and in the return stroke of the needle is effectively taken up by the tensioning device 40 and the possibility of the formation of an objectionable loop around the needle tip in the region of the knotter mechanism, with consequent severe fraying of the twine and knot failure, is prevented.

It will be seen from the foregoing that a twine tensioning device is provided which very effectively prevents the throwing of a loop of twine over the needle tips during the tying cycle and which is extremely simple in construction and readily applicable to existing balers as an attachment.

While the preferred structure in which the principles of the present invention have been incorporated is shown and described above, it is to be understood that the invention is not to be limited to the particular details shown and described above, but that, in fact, widely different means may be employed in the practice of the broader aspects of the invention.

We claim:

1. A twine tensioning attachment for baling machines having a bale case in which bales are formed, a U-shaped yoke member pivotally mounted on said bale case, a needle carried by said yoke member having a twine eye therein, a knotter mechanism mounted on said bale case, and a twine box supported from said bale case, said tensioning attachment comprising a pivotally mounted spring loaded twine tensioning lever mounted adjacent to said twine box, a twine guide carried by said lever at the free end thereof, and fixed twine guide means located in proximity to said needle whereby tension is applied to twine fed from said twine box through said lever twine guide, then through said fixed twine guide means, then through the eye of said needle and finally to said knotter mechanism of the baler.

2. A twine tensioning attachment as described in claim 1, wherein said spring loaded twine tensioning lever is pivotally mounted on said twine box and wherein said fixed twine guide means is secured on a support bracket mounted on the bottom of said bale case.

3. A twine tensioning attachment as described in claim 1, wherein said twine box is provided with a friction device through which twine leading from the twine box to said lever twine guide passes.

4. A twine tensioning attachment as described in claim 2, wherein said twine box is mounted at one side of said bale case forwardly of the said needle and wherein said support bracket is mounted on the bottom of said bale case at a location between said tensioning lever and said needle.

5. A twine tensioning attachment for baling machine having a bale case in which bales are formed, a U-shaped yoke member pivotally mounted on said bale case, a pair of laterally spaced needles carried by said yoke member having twine eyes therein, a knotter mechanism mounted on said bale case, and a twine box supported from said bale case, said tensioning attachment comprising a pair of twine supply spools in said twine box, a single pivotally mounted spring loaded twine tensioning lever mounted adjacent to said twine box, a twine guide carried by said lever at the free end thereof, an upright support bracket depending from the bottom of said bale case, a horizontally disposed lower twine guide ferrule secured on said bracket, a pair of laterally spaced vertically disposed twine guide ferrules secured on said bracket in alignment with said laterally spaced needles whereby tension is applied to twine fed from one supply spool through said lever twine guide, then through said horizontally disposed lower twine guide and then through one of the vertically disposed ferrules to one of said needles, and whereby tension is applied to twine fed from the other supply spool through said lever twine guide, then through the other of said vertically disposed ferrules to the other of said needles.